(12) United States Patent
Watkins et al.

(10) Patent No.: US 6,597,807 B1
(45) Date of Patent: Jul. 22, 2003

(54) METHOD FOR RED GREEN BLUE (RGB) STEREO SENSOR FUSION

(75) Inventors: Wendell R. Watkins, El Paso, TX (US); Jay B. Jordan, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/408,655

(22) Filed: Sep. 27, 1999

(51) Int. Cl.$^7$ ................................................ G06K 9/00

(52) U.S. Cl. .................... 382/164; 382/154; 348/33; 348/47

(58) Field of Search ................... 382/154, 164; 348/47, 48, 32, 33, 44, 490, 29, 60; 356/12

(56) References Cited

U.S. PATENT DOCUMENTS

| | | | |
|---|---|---|---|
| 4,805,015 A | 2/1989 | Copeland | 358/88 |
| 5,383,013 A | 1/1995 | Cox | 356/2 |
| 5,495,576 A | 2/1996 | Ritchey | 395/125 |
| 5,555,324 A | 9/1996 | Waxman et al. | 382/254 |
| H1599 H | * 10/1996 | Task et al. | 348/32 |
| 6,333,757 B1 | * 12/2001 | Faris | 348/60 |

OTHER PUBLICATIONS

Field Evaluations of Dual-Band Fusion for Color Night Vision, M. Aguilar, D.A. Fay, D.B. Ireland, J.P. Racamato, W.D. Ross and A.M. Waxman,; SPIE Conference Apr. 1999, vol. 3691.

FSI Pushing IR Technologies Into Broader-Based Markets, Paul Proctor; Aviation Week & Space Technology Apr. 21, 1997.

* cited by examiner

*Primary Examiner*—Amelia M. Au
*Assistant Examiner*—Colin LaRose
(74) *Attorney, Agent, or Firm*—William V. Adams; Mark D. Kelly

(57) ABSTRACT

Red-Green-Blue color-coding of overlaid registered stereo pair imagery from different spectral regions (for example, near-, mid-, and far-infrared) can be used to derive depth perception information. The human preattentive vision process uses coarse spatial structure in the scene to fuse the images for the detection of depth and motion cues. Optimization is accomplished by assigning green to the lowest spatial frequency content image, then red to the next lowest, and finally blue. If the fusion of one of the colored imagery layers produces depth perception information in one portion of the scene whereas the other two colored layers do not, the human mind can retain the information from this color and discard the inputs from the other two colors as noise. The same is true for the other two colors. Human color discrimination and depth perception are combined to greatly enhance preattentive object recognition in the fused stereo pair imagery.

8 Claims, 2 Drawing Sheets

(1 of 2 Drawing Sheet(s) Filed in Color)

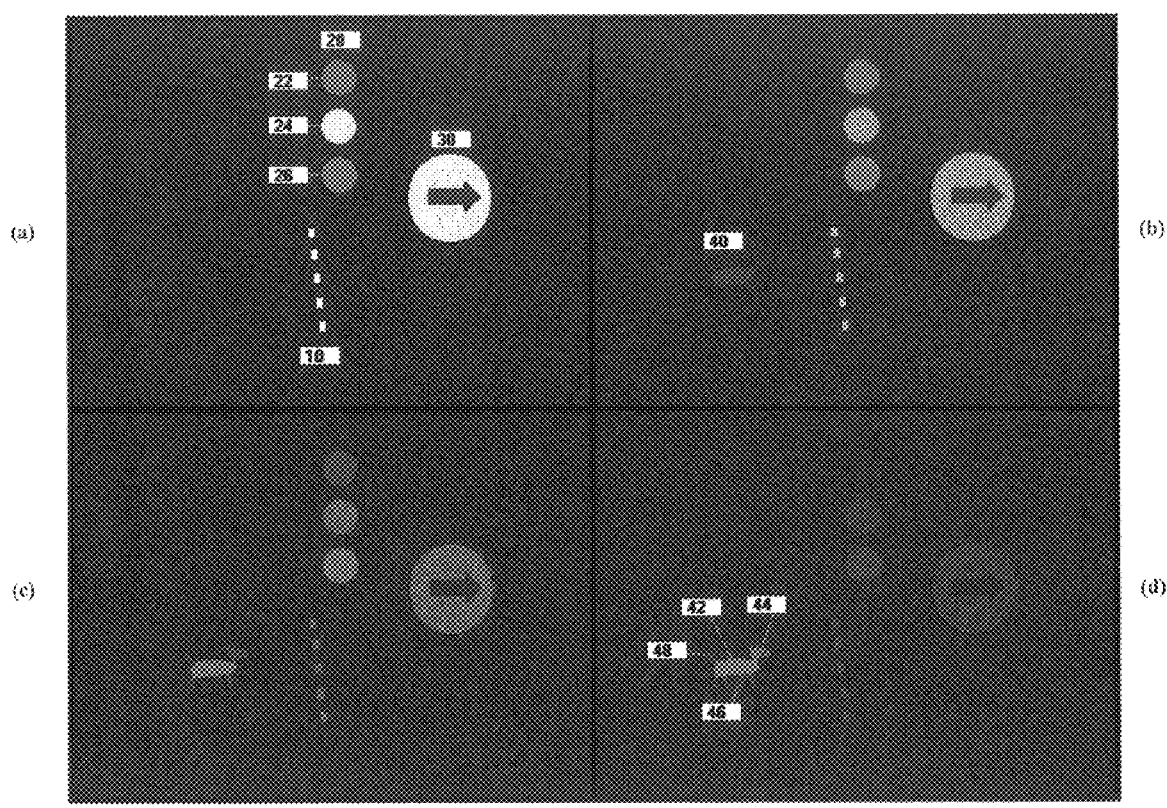
FIGURE 2 (a) – (d). Succession of four color snapshots one-half second apart showing the combination of visible with RGB stereo sensor fusion overlaid for one line of sight.

METHOD FOR RED GREEN BLUE (RGB) STEREO SENSOR FUSION

FIELD OF THE INVENTION

This invention relates to a method for stereoscopic viewing and imaging. More particularly, the invention is directed to a stereoscopic method for enhancing and displaying data from multiple sensors so that an observer can rapidly distinguish targets in a cluttered and noisy environment using the preattentive processing capabilities of the human visual system.

BACKGROUND

To be successful in combat, a pilot must rapidly integrate and synthesize a great deal of information in a noisy, confusing, and frequently disorienting environment. The soldier on the battlefield is increasingly provided with sophisticated electronic systems that rely on data acquired from a number of different sensors. Such electronic sensor systems are capable of intercepting electromagnetic radiation in frequency spectrums typically occupied by offensive and defensive military weapon systems as well as receiving signals in the visible, infrared and ultraviolet light range, and sensing pressure, vibration, sound and magnetic field variations. Significant advances have been made in target detection by processing and fusion of data received from multiple sensors. Recent efforts have explored cooperative control among various platforms and methods to obtain multi-asset synchronization of data. Research also has explored adaptive sensor management techniques to respond to situational changes, optimizing data distinctiveness, defining levels of responsibility, including sensor complement optimization, database information management, model based reasoning, context sensitivity and efficiency, and client/server relationships that take advantage of object oriented software and parallel processing techniques to achieve greater processing speed and thus make better real time use of the synergistic information obtained from multiple sensors. While such advances have improved target tracking and detection, true automatic target detection and tracking have not yet been achieved with any reasonable degree of confidence and, thus, the human operator is still very much in the control loop. Yet, comparatively little effort has gone into taking best advantage of the built in processing capabilities of the human perception system.

Efforts have been devoted instead, to extending the human visual perception system. This includes overlaying grayscale imagery from single or dual band infrared sensors and other weather penetrating sensor imagery with low-light visible imagery. For example, FLIR Systems Inc. (FSI) has developed a gray-scale pilot's heads up display which overlays registered grayscale infrared and millimeter energy with the normal nighttime visual scene in order to provide a pilot with better visual reference during bad weather approaches. However, because different physical features are imaged by the various sensors such grayscale detection methods often actually result in degradation in object recognition and/or image quality. Aguilar, et al. at Massachusetts Institute of Technology (MIT) Lincoln Laboratory have experimented with a system for enhancing night vision based on the fusion of low-light visible and infrared sensors into a single color composite. "Field Evaluation of Dual-Band Fusion for Color Night Vision," M. Aguilar et al., *SPIE Conference on Enhanced and Synthetic Vision*, April 1999, SPIE Vol. 3691. Aguilar et al.'s approach assigns red, green and blue (RGB) colors to sensor channels so that the image uses brightness contrast to present information from the visible bands while using color contrast to represent the thermal vs. visible information in the scene. While the resultant false color images are more natural in appearance than grayscale night vision images (i.e., the sky is blue and the trees green) such attempts to color match different grayscale imagery from spectral regions outside of the visible band to the individual color cone response do not significantly enhance target recognition, especially in cluttered backgrounds.

OBJECTS AND SUMMARY OF INVENTION

It is an object of the invention to provide improved methods of stereoscopic viewing and imaging. It is a further object of the invention to provide methods for enhancing and displaying data from multiple sensors so that an observer can rapidly distinguish targets in a cluttered and noisy environment using the preattentive processing capabilities of the human visual system. These and other objects are satisfied, at least in part, by a method for processing signals from a plurality of sensors representing different spectral views of the same three dimensional scene that includes obtaining first left and right stereo signals from a pair of left and right sensors sensitive in a first spectral range which includes assigning a first Red-Green-Blue (RGB) color code to the first left and right stereo signals to enhance object recognition and perception, obtaining second left and right stereo signals from a pair of left and right sensors sensitive in a second spectral range, assigning a second Red-Green-Blue (RGB) color code to the second left and right stereo signals to enhance object recognition and perception. In a preferred embodiment of the invention, the first left and right sensor pairs are sensitive in the infrared range. In another preferred embodiment, the second left and right sensor pairs are sensitive in the visible range. In yet another embodiment, the method includes obtaining signals from third left and right sensor pairs sensitive in a third spectral range different from the first and second spectral ranges, and assigning a third Red-Green-Blue (RGB) color code to the third left and right stereo signals to enhance object recognition and perception. In another embodiment, the first, second and third left and right sensor pairs are sensitive in the near, mid and far infrared ranges, respectively.

Still another embodiment includes a method of displaying fused sensory data as color stereo images, the data obtained from stereo pair sensors, including assigning a Red-Green-Blue (RGB) color code to the first left and right stereo signals to enhance object recognition and perception, obtaining second left and right stereo signals from a pair of left and right sensors sensitive in a second spectral range, assigning a second Red-Green-Blue (RGB) color code to the second left and right stereo signals to enhance object recognition and perception and displaying the RGB color-coded data in a color stereoscopic image. In still yet another embodiment, the invention includes overlaying the RGB coded signals on a heads-up display so that periodically the RGB sensor fused information ramps in overall intensity from zero to a maximum percentage. The maximum percentage is determined for the particular application. Still other objects of the present invention will become readily apparent to those skilled in this art from the following description wherein, where there is shown and described a preferred embodiment of this invention, simply by way of illustration one of the modes to best carry out the invention. As it will be realized, the invention is capable of other different embodiments and its several details are capable of modification in various, obvious aspects all without departing from the invention.

Accordingly, the drawing and descriptions will be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2(a)–(d) show a succession of four color snapshots of a combined display one-half second apart starting from upper left with no RGB stereo sensor fusion overlay, then upper right with the RGB stereo sensor fusion at one-quarter intensity and the standard visible at three-quarters, then lower left both displays at one-half intensity, and finally lower right with the RGB stereo sensor fusion display at three-quarters and the standard visible display at one-quarter display intensity.

DETAILED DESCRIPTION

Figure 1:
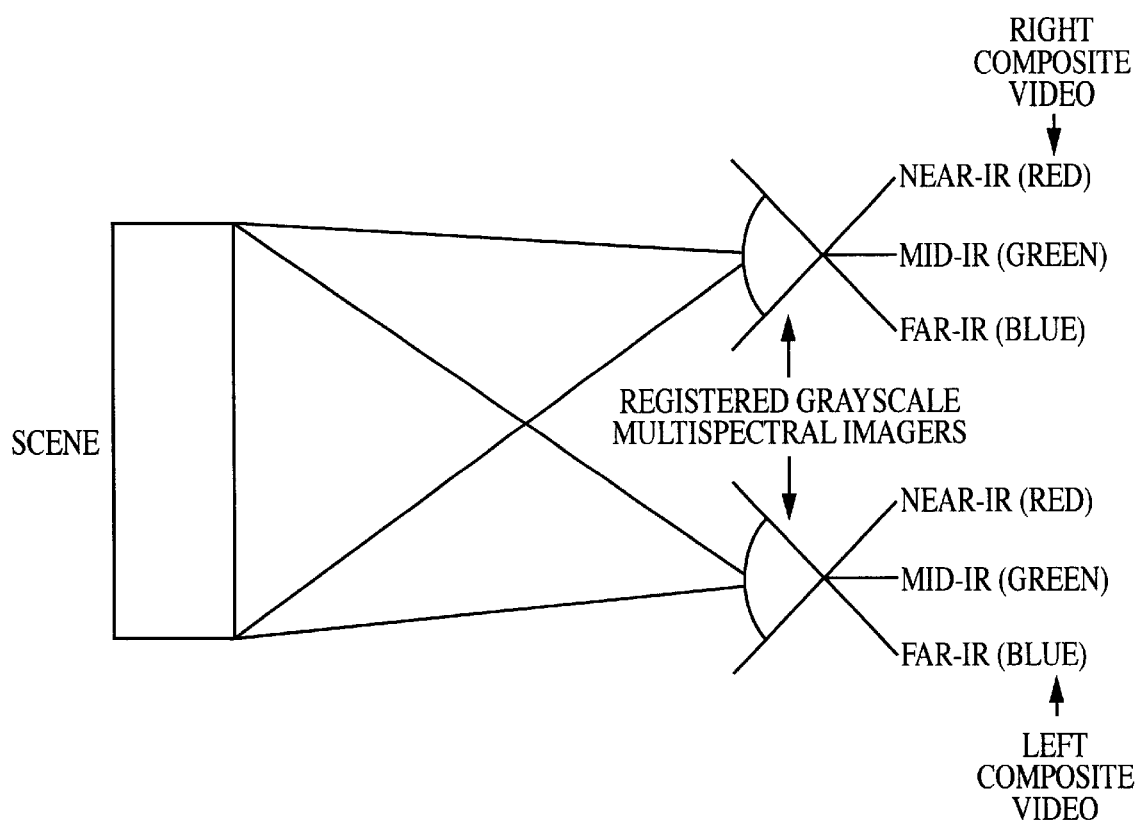
FIG. 1 is a graphic depiction of how human color discrimination and depth perception are used in combination to greatly enhance preattentive object recognition in the fused stereo pair imagery of the scene.

We have discovered that the key to enhanced target recognition lies in utilizing the preattentive processing capabilities of the human vision system by presenting the data from fusion of multiple spectral band imaging sensors in a format that allows scenes to be displayed with both color and, most critically, with dual line of sight information. This can optimally be done using RGB when the human vision system is in the loop as the depth perception analyzer. Different color-coding might be used if the technique can be automated for machine processing alone.

Humans, like most predators have binaural vision. Predators generally have eyes set on the front of their heads so they can use precise, binocular vision to track and identify their prey. In addition, it is well known that the human visual system and the visual systems of other predators process images and recognize certain features very rapidly, or "preattentively," in parallel, without the need for focused attention and with little or no effort. In particular, a visual element's three-dimensionality is processed preattentively. The preattentive system analyses features such as symmetry, eccentricity, and color contrast and combines these features with an object hypothesis. To recognize a certain object in the visual field, the preattentive system uses spatial cues, color information, and texture to select a corresponding pattern and then transforms it into an object-centered reference based on preconceived notions of what real-world objects look like. This built-in parallel processing capability is what makes an object "pop-out" of an otherwise invisible scene.

Our trichromatic color vision is based on the responses of retinal photoreceptors (cones) belonging to three classes, which differ in their sensitivities to light of different wavelengths. With information from only three overlapping wavelength regions, red, green and blue, humans are capable of distinguishing millions of different colors. The selection of a particular Red-Green-Blue (RGB) color code is important in optimizing the intended application. For example, in the case of search and target acquisition the application requires distinguishing the target from its background that may include false target clutter. In the case of navigation an overall situational awareness is needed including identification of objects that represent hazards. The choice of Red-Green-Blue (RGB) color code will impact how well each application can be performed. In the case of target detection, green is chosen to color code the spectral sensor imagery channel that has the lowest spatial frequency components of the target highlighted (i.e., the largest patches on the target distinguishable). Red is used to color code the spectral sensor imagery channel that has the next lowest spatial frequency components of the target highlighted; and blue, the last spectral sensor imagery channel. This stems from the fact that the human visual system is most sensitive to green and then yellow, which represents a combination of green and red light colors. Errors in detecting a target can be caused by accentuating high spatial frequency features of the target with green or yellow in the presence of image degradations such as noise. In this case important low spatial frequency target distinguishing features that are accentuated by blue may be missed. For ground targets red and green are primary cone sensors used in the discrimination process and this process has developed over millennia due in no small part in searching for food and keeping from being eaten. Blue is used for detecting objects in skies and water. One area where color-coding has been used with some limited effectiveness is in the display of stereo pair images. Anaglyphic motion pictures and images are displayed with a small left to right offset on a two-dimensional surface to view the stereoscopic scene content. This is done by using one of the RGB human cone colors for the left image and another for the right image and viewing the resulting image through color filter glasses that are coded with the chosen cone colors for the corresponding eyes. This process does not work well when complex grayscale stereo images are simply color coded and displayed with or without left to right offset of the different views. What has not been tried is to color code fused imagery from grayscale representations of different spectral regions as stereo pair images. For example, if registered imagery is taken from two lines of sight to form a stereo pair simultaneously in near-, mid-, and far-infrared, Red-Green-Blue (RGB) color coding can be used to enhance the human depth perception process. The near-infrared imagery could be color coded with red, the mid-infrared with green, and the far infrared with blue (or an RGB color code representing any other combination of the RGB colors). The left line of sight imagery could be displayed to the left eye as a fused color image by combining the separate RGB scenes as a single image. The same could be done with the right line of sight imagery. In this way the display will optimize the human stereo fusion process that uses coarse texture or spatial structure features to fuse the images for depth perception. The advantage of this type of display stems from the fusion by color. If the near-infrared imagery has discernable texture or spatial structure in one portion of the scene whereas the mid- and far-infrared do not, then the mind will be able to fuse the red cone sensor imagery of this portion of the scene with the blue and green cone content treated as noise. The same would be true for depth perception content for the other two color-coded images. In this way human color discrimination and depth perception are used in combination to greatly enhance preattentive object recognition in the fused stereo pair imagery of the scene. This concept is illustrated in FIG. 1. Using the Red-Green-Blue-Stereo-Sensor-Fusion (RGBSSF) the emphasis is shifted away from color discrimination and focuses on the human stereo fusion process that occurs automatically in preattentive vision. In this way more emphasis is placed on the depth perception function of human vision that is not keyed to any particular choice of false coloring of the grayscale texture and features present in the other-than-visible spectral imagery.

The selection of a particular Red-Green-Blue (RGB) color code is important in optimizing the intended application. For example, in the case of search and target acquisition the application requires distinguishing the target from its background that may include false target clutter. In the case of navigation an overall situational awareness is needed including identification of objects that represent hazards. The choice of Red-Green-Blue (RGB) color code will impact how well each application can be performed. In the case of target detection, green is chosen to color code the spectral sensor imagery channel that has the lowest spatial frequency components of the target highlighted (i.e., the largest patches on the target distinguishable). Red is used to color code the spectral sensor imagery channel that has the next lowest spatial frequency components of the target highlighted; and blue, the last spectral sensor imagery channel. This stems from the fact that the human visual system is most sensitive to green and then yellow, which represents a combination of green and red light colors. Errors in detecting a target can be caused by accentuating high spatial frequency features of the target with green or yellow in the presence of image degradations such as noise. In this case important low spatial frequency target distinguishing features that are accentuated by blue may be missed.

The present invention thus provides a meaningful way of presenting and synthesizing a vast amount of multiple sensor information in a noisy environment in order to take best advantage of the innate processing capabilities of human perception, particularly the human vision system by presenting visual information that maximizes the built in processing capabilities of the human visual system.

In some applications, a false coloring scheme may not be possible. For example, a false coloring scheme for enhancing night vision in an automobile may optimize color contrast for the image as a whole but will degrade the operator's ability to acquire the right visual color cues for driving safely, as in the case of red, green, and yellow signal lights and road signs. In addition, many aircraft runways have Visual Approach Slope Indicators (VASI's) where an aircraft's glideslope is indicated by the color of a series of lights positioned near the approach. For such applications where true color perception is critical, the RGB stereo sensor fusion technique of the present application could be overlaid on the visible color scene so that during a brief time interval the RGB sensor fused information would ramp in overall intensity from zero to a large maximum percentage. The maximum percentage should be selected such that the stereo depth perception is distinguishable but the visual color cues are not lost. For example, during the first half second of a two second interval the intensity of the RGB sensor fused information could ramp up from zero to 25 percent, during the second half second to 50 percent, during the third half second to 75 percent with the last half second interval being reset to zero. In this way the visible color cues will not be lost yet the sensor-fused hazard cues will be accented during each 2-second interval.

FIGS. 2(a)-(d) show a succession of four snapshots of a highway scene, including divided roadway 10, traffic light 20 with red light 22, yellow light 24 and green light 26 each illuminated, and yellow road sign 30. Also shown in FIGS. 2(b)-(d) is animal navigation hazard 40. The snapshots have been taken one-half second apart and show an overlay of RGB sensor fusion on top of a standard visible display with the overlay appearing in increasing intensity relative to the visible display. FIG. 2(a) (upper left) has no RGB sensor fusion overlay and shows the scene, as it would appear to the naked eye. Red light 22, yellow light 24 and green light 26 of traffic light 20 and yellow road sign 30 are seen in their true colors. Animal navigation hazard 40, which could be a black sheep, is not visible to the naked eye. FIG. 2(b) (upper right) shows an overlay of the RGB sensor fusion at one-quarter intensity and the standard visible at three-quarters. The true colors of red light 22, yellow light 24 and green light 26 of traffic light 20 and yellow road sign 30 are now somewhat muted by the RGB fusion overlay, however, animal navigation hazard 40 can now be seen from the sensor fusion data overlay. In FIG. 2(c) (lower left), both displays are at one-half intensity, the true colors of red light 22, yellow light 24 and green light 26 of traffic light 20 and yellow road sign 30 are more altered, however, animal navigation hazard 40 is shown in increased intensity. Finally, FIG. 2(d) (lower right), shows the RGB sensor fusion display at three-quarters and the standard visible display at one-quarter display intensity. Animal navigation hazard 40 is now brightly illuminated, since the RGB sensor fusion color code has been optimized for visibility of road hazards. For example, animal navigation hazard 40 has a green body 42 from the green channel sensor that highlights the lowest spatial frequency on the animal. The head 44 is red representing the next lowest spatial frequency component with the next and overlap of green and red that shows up as yellow. Finally, the legs 46 and tail 48 are blue representing the highest spatial frequency components. Of course, there will also be a second view of the same scene with the appropriate offset of the individual objects with respect to each other caused by the different viewing angle. The true colors of red light 22, yellow light 24 and green light 26 of traffic light 20 and yellow road sign 30 are, however, quite degraded by the intensity of the RGB overlay in FIG. 2(d). However, periodically varying the intensity of the overlay in this manner will permit the observer to see the true colors of the scene and at the same time observe the RGB enhanced stereo sensor fusion data. Alternatively, the observer could manually decrease the intensity or relative intensity of the RGB stereo sensor overlay whenever the true colors of objects in a scene must be observed.

In this application "left" and "right" simply refer to two different perspectives in any three dimensional space. The important aspect is to optimize the depth and contour information obtained by the RGB color stereo imagery without losing the essential visual color cues that the visible imagery contains and on top of which the Red-Green-Blue (RGB) color-coded stereo imagery from other spectral sensors is overlaid.

While sensors may be infrared and low light visible, they might also be pressure or vibration sensors, or magnetic or electric field sensors, or any other sensor capable of gathering data that can be mapped in a three dimensional space. In addition, with appropriate filtering, a single sensor may be used to provide data from more than one spectral range. Thus, a sensor capable of sensing both near and far infrared light, or a sensor that is sensitive to both vibration and pressure, might be used in place of two sensors.

Having thus shown and described what are at present considered to be preferred embodiments of the present invention, it should be noted that the same have been made by way of illustration and not limitation. Accordingly, all modifications, alterations and changes coming within the spirit and scope of the present invention are herein meant to be included.

We claim:

1. A method for processing signals using preattentive human vision from a plurality of sensors representing different spectral ranges of the same three dimensional scene, comprising:

obtaining first left and right stereo signals from a pair of left and right sensors sensitive in a first spectral range, said first spectral range having a spatial frequency content lower than any other spectral range;

assigning a first Red-Green-Blue (RGB) color code green, for which humans are most sensitive, to the first left and right stereo signals to enhance object recognition and perception;

obtaining second left and right stereo signals from a pair of left and right sensors sensitive in a second spectral range, said second spectral range having the next lower spatial frequency content;

assigning a second Red-Green-Blue (RGB) color code red for which humans are next most sensitive, to the second left and right stereo signals to enhance object recognition and perception.

2. A method according to claim 1 wherein the first left and right sensor pairs are sensitive in the infrared range.

3. A method according to claim 2 wherein the second left and right sensor pairs are sensitive in the visible range.

4. A method according to claim 1 further comprising: obtaining signals from third left and right sensor pairs sensitive in a third spectral range different from the first and second spectral ranges, said third spectral range having the next lowest spatial frequency content, and assigning a third Red-Green-Blue (RGB) color code blue, for which humans are least sensitive, to the third left and right stereo signals to enhance object recognition and perception.

5. A method according to claim 4 wherein the first, second, and third left and right sensor pairs are sensitive in the near, mid, and far infrared ranges, respectively.

6. A method of displaying fused sensory data as color stereo images for viewing using preattentive human vision, the data obtained from stereo pair sensors, comprising:

obtaining first left and right stereo signals from a pair of left and right sensors sensitive in a first spectral range, said first spectral range having a spatial frequency content lower than any other spectral range;

assigning a first Red-Green-Blue (RGB) color code green, for which humans are most sensitive, to the first left and right stereo signals to enhance object recognition and perception;

obtaining second left and right stereo signals from a pair of left and right sensors sensitive in a second spectral range, said second spectral range having the next lower spatial frequency content;

assigning a second Red-Green-Blue (RGB) color code red for which humans are next most sensitive, to the second left and right stereo signals to enhance object recognition and perception; and displaying the RGB coded data in a color stereoscopic image.

7. A method according to claim 6 further comprising:

overlaying the RGB coded signals on a display so that periodically the RGB sensor fused information ramps in overall intensity from zero to a maximum percentage.

8. A method according to claim 6 further comprising:

overlaying the RGB coded signals on a display so that the RGB sensor fused information is adjustable in overall intensity from zero to a maximum percentage.

* * * * *